(12) United States Patent
Haertel et al.

(10) Patent No.: US 6,695,117 B2
(45) Date of Patent: Feb. 24, 2004

(54) MOTOR VEHICLE TRANSMISSION WITH A PARKING LOCK MECHANISM

(75) Inventors: Carsten Haertel, Fellbach (DE); Simon Jenko, Hattenhofen (DE); Michael Jud, Maikammer (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/179,016

(22) Filed: Jun. 26, 2002

(65) Prior Publication Data

US 2003/0006106 A1 Jan. 9, 2003

(30) Foreign Application Priority Data

Jun. 27, 2001 (DE) .......................... 101 30 906

(51) Int. Cl.[7] .......................... F16H 63/38; B60K 41/26
(52) U.S. Cl. .................... 192/219.4; 192/221; 74/411.5
(58) Field of Search .............. 192/219.4, 221; 74/411.5; 188/353

(56) References Cited

U.S. PATENT DOCUMENTS

| | | | | |
|---|---|---|---|---|
| 4,024,936 A | * | 5/1977 | Crabb | 192/221 |
| 4,437,550 A | * | 3/1984 | Nozawa | 192/3.24 |
| 4,588,057 A | * | 5/1986 | Weich et al. | 477/199 |
| 4,624,353 A | * | 11/1986 | Sailer et al. | 192/70.12 |
| 4,667,527 A | * | 5/1987 | Ehrlinger et al. | 74/411.5 |

FOREIGN PATENT DOCUMENTS

| | | | |
|---|---|---|---|
| DE | 19533141 C1 | 2/1997 | |
| DE | 19833397 A1 | 2/2000 | |
| DE | 10029628 A1 | 3/2001 | |
| JP | 05003666 A | * 1/1993 | H02K/49/10 |

OTHER PUBLICATIONS

G. Lechner, *Fahrzeuggetriebe*, Springer–Verlag, 1994, pp. 232–233.

* cited by examiner

*Primary Examiner*—Richard M. Lorence
(74) *Attorney, Agent, or Firm*—Crowell & Moring LLP

(57) ABSTRACT

A motor vehicle transmission with a frictional parking lock mechanism is particularly suitable for shift-by-wire applications. The frictional parking lock mechanism makes it possible to have convenient controllability, as compared with positive parking lock mechanisms.

20 Claims, 2 Drawing Sheets

MOTOR VEHICLE TRANSMISSION WITH A PARKING LOCK MECHANISM

This application claims the priority of German application 101 30 906.6, filed Jun. 27, 2001, the disclosure of which is expressly incorporated by reference herein.

BACKGROUND AND SUMMARY OF THE INVENTION

The present invention relates to a motor vehicle transmission with a parking lock mechanism.

A parking lock system for an automatic transmission with a hydraulic torque converter is known from LECHNER, G., Fahrzeuggetriebe [Vehicle Transmissions], Springer-Verlag, 1994, pages 232 to 233. Such a parking lock system with positive interlock must secure the vehicle reliably against rolling away, even on a downward or upward gradient, when the parking brake is not actuated. This also has to be ensured, where possible, when, with the vehicle stationary, direct actuation by means of a parking-lock wheel-tooth/pawl-tooth position is not possible, but the stopped vehicle could subsequently move independently. The latched parking lock mechanism must likewise also be capable of being released again without difficulty.

German patent publications DE 195 33 141 C1 and DE 100 29 628 A1 already disclose parking lock mechanisms which make frictional connections such as those of the invention.

The object of the invention is to provide a convenient motor vehicle transmission with a parking lock mechanism.

The object referred to is advantageously achieved, according to the invention, by a motor vehicle transmission with a parking lock mechanism including a friction brake by which a frictional connection can be made between a transmission case and a transmission shaft, with the friction brake being engageable and disengageable.

One advantage of the invention is that engagement operations of the parking lock mechanism can be controlled continuously. In this case, the required locking moment is generated with the aid of a frictional parking lock mechanism. It is thus advantageously possible to eliminate the drive-train stress-relief bump by means of a regulated operation of disengaging the parking lock mechanism. This contributes to an increased improvement in comfort.

In the overall structure of this system, with what is known as "shift by wire", the release of the parking lock mechanism no longer requires any additional effort which depends directly proportionally on the downward or the upward gradient when vehicle-side manual actuation is used. It is possible, in this connection, to sense the vehicle speed more accurately, so that the frictional parking lock mechanism or a friction brake is protected against unnecessary wear or unnecessary destruction as a result of more accurate control/regulation. Thus, in the case of a P-R-N-D manual selector lever for selecting the driving range, it is possible, even at relatively high limit speeds, to allow a shift from N to R, for example during manoeuvring. A further shift from R to P is possible on the selector lever, but is not allowed within the transmission by the shift logics.

According to a particularly advantageous refinement of the invention, force amplification as a result of the cone angle is utilized. Since the shift force has to be applied by the hydraulic system, the power losses in the hydraulic system of the motor vehicle transmission with a friction brake are lower in the embodiment according to the invention than, for example, when multiple-disc clutches are used.

In refinements of the invention providing a further improvement in the overall efficiency of the motor vehicle transmission, a force accumulator which exerts the holding force necessary for self-locking makes it possible to compensate wear and manufacturing tolerances in a particularly advantageous way.

In another refinement of the invention, particularly convenient control of the engagement and disengagement of the parking lock mechanism becomes possible.

Further advantages of the invention may be gathered from various claims, the description and the drawings.

BRIEF DESCRIPTION OF THE DRAWINGS

The invention is described in more detail below with reference to an embodiment illustrated by way of example in the drawings.

DETAILED DESCRIPTION OF THE INVENTION

Figure 1:
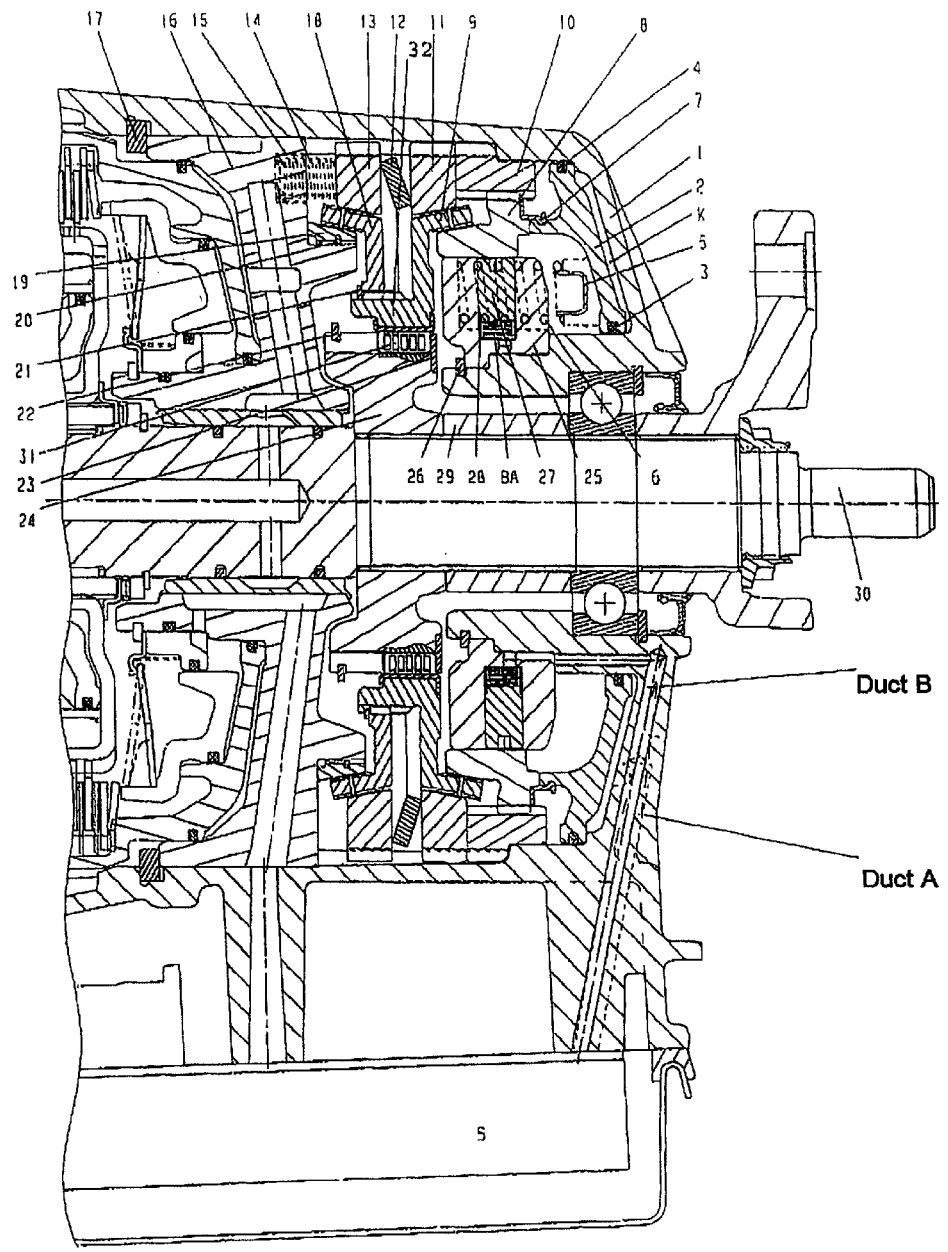
FIG. 1 shows a cutaway part of an automatic planetary transmission with a parking lock mechanism in the disengaged state.

FIG. 1 shows a cutaway part of an automatic planetary transmission with a parking lock mechanism in the disengaged state.

In this case, according to the illustration in the drawing, the direction pointing from a connecting flange of a transmission output shaft 30 to an engine, not illustrated in any more detail, is designated as left and the opposite direction as right.

The automatic planetary transmission is one which receives the driver's input regarding the driving range by means of electrical signals. Such a transmission system is also designated conventionally as shift-by-wire.

The parking lock mechanism comprises a friction brake, by means of which a frictional connection can be made between the transmission case 1 and the transmission output shaft 30.

The parking lock mechanism is arranged within a transmission case 1 of the automatic planetary transmission. The parking lock mechanism comprises a hydraulic piston 2, by means of which the friction brake can be engaged and disengaged, that is to say can be transferred into the disengaged state shown and an engaged state evident in FIG. 2. This axially displaceable hydraulic piston 2 encloses, together with the transmission case 1, an annular piston space K, for this purpose the hydraulic piston 2 bearing sealingly on the transmission case 1 by means of two sealing rings 3, 4. The piston space K is in this case capable of being acted upon hydraulically by a duct A. The hydraulic piston 2 is indirectly supported on the transmission case 1 to the left by means of a piston return spring 6. This piston return spring 6 is held on the hydraulic piston 2 by means of a spring support sleeve 5 and is supported on the transmission case 1 by means of a support ring 25 fastened fixedly in terms of rotation and axially non-displaceably to the transmission case 1. To provide axial non-displaceability in a mountable way, the support ring 25 bears on the right against a step of the transmission case 1 and on the left against a spring ring 26 inserted into the transmission case 1.

The support ring 25 has incorporated in it circumferentially a plurality of radially outward-extending bores which receive helical tension springs 28, and locking bolts 27 arranged coaxially to these bores. The helical tension springs 28 are fastened with their radially inner ends to the support ring 25 and with their radially outer ends to the locking bolt 27. The locking bolts 27 are flush at their radially outer ends with an outer surface of the support ring 25. Within the helical tension springs 28 are formed action spaces BA which are connected by an annular groove to a duct B capable of being acted upon hydraulically.

A conical inner ring 8 is supported on a left-hand step of the hydraulic piston 2 and is connected essentially firmly to the hydraulic piston 2 by means of a snap ring 7 so as to maintain slight elastic moveability. The conical inner ring 8 is guided axially displaceably on the outer surface of the coaxially arranged support ring 25 and is fixed in terms of rotation with respect to the transmission case 1 by means of a toothing pairing. This toothing pairing is formed by an external toothing of the conical inner ring 8 and an internal toothing of a guide ring 10 which is supported on the transmission case 1 fixedly in terms of rotation and in the direction pointing to the right. Supported on the guide ring 10 in the direction pointing to the left, on the transmission case 1, are, in succession, a conical outer ring 11, a cup spring 12, a conical outer ring 13, two return springs 14, only one of which can be seen in the drawing, a spring support sleeve 15, a guide 16, and a thrust ring 17.

A conical disc 9 is arranged between conical surfaces of the conical inner ring 8 and of the conical outer ring 11 in a similar way to a double-cone synchronization device. The conical disc 9 is coated on both sides with scatter-sintered friction linings. The conical disc 9 has, radially on the inside, an annular extension 32 which extends to the left and which is toothed both internally and externally. Into the external toothing of this annular extension 32 engages an internal toothing of a conical disc 18 which is likewise coated on both sides with scatter-sintered friction linings. This conical disc 18 is arranged, in the region of the two scatter-sintered linings, between the conical surfaces of the conical outer ring 13 and of a conical inner ring 19. The latter conical inner ring 19 is connected fixedly in terms of movement to the guide 16 by means of a round-wire ring 20.

The conical disc 18 is supported radially inwards, that is to say in the region of its internal toothing, on the annular extension 32 in the direction pointing to the left by means of a spring ring 21. The two conical discs 9, 18 are thus displaceable relative to one another to a limited extent. The annular extension 32 has an internal toothing which engages into an external toothing of a transmission ring 24 which is connected fixedly in terms of movement to the transmission output shaft 30. A linear roller guide 31 is arranged between the internal toothing of the annular extension 32 and the external toothing of the transmission ring 24, so that the conical disc 9, in one piece with the annular extension 32, is axially displaceable relative to the transmission ring 24 with low frictional loss. Axial displacement of the annular extension 32 to the left relative to the transmission ring 24 is limited by means of a spring ring 22. On a right-hand end face of the transmission ring 24, a stop disc 23 for securing the linear roller guide 31 is pressed into the linear roller guide 31.

To make a connection fixed in terms of movement between the transmission ring 24 and the transmission output shaft 30, the transmission ring forms, radially on the inside, a toothing pairing with the transmission output shaft 30. Furthermore, the transmission ring 24 is braced axially between a step of the transmission output shaft 30, on the one hand, and a spacer ring 29, a ball-bearing inner ring, the connecting flange and a nut connected moveably by screwing to the transmission output shaft 30, on the other hand.

Figure 2:
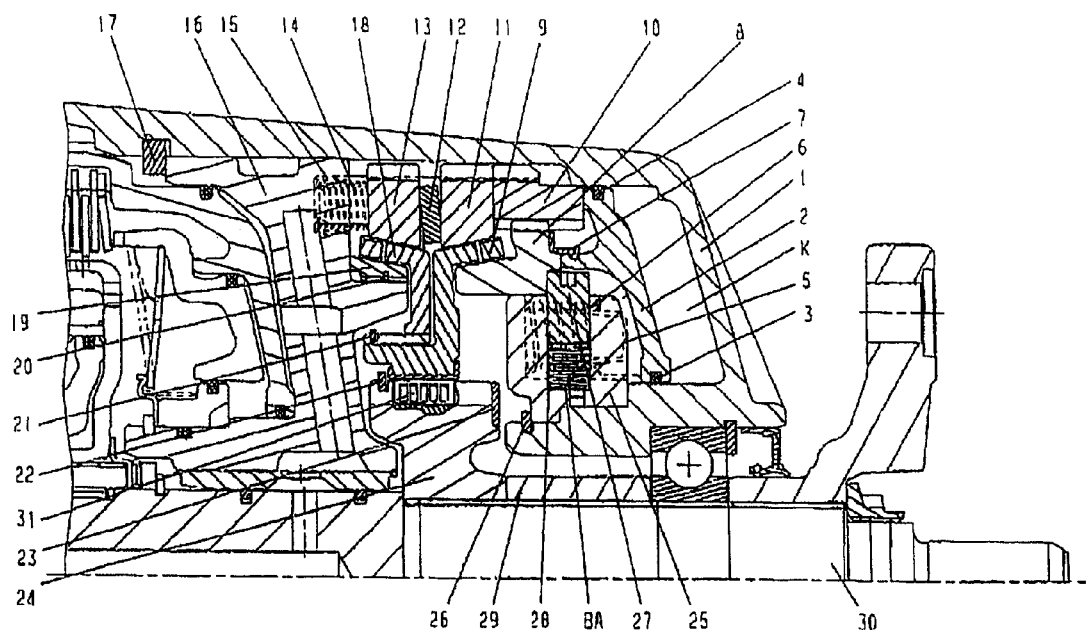
FIG. 2 shows a cutaway part of the automatic planetary transmission of FIG. 1 with the parking lock mechanism in the engaged state.

The functioning of the parking lock mechanism is explained in more detail below with reference to FIG. 1 and FIG. 2.

The engagement of the parking lock mechanism is subdivided below into five individual strokes for a clearer understanding. By means of the first four strokes, the conical surfaces of the conical inner ring 8, of the conical disc 9, of the conical outer ring 11, of the conical outer ring 13, of the conical disc 18, and of the conical inner ring 19, are pressed against one another, with the lifting clearances being overcome. The last and, at the same time, largest part-stroke, which is designated here as an overpressure stroke, serves for compressing the cup spring 12 over a corresponding effective spring excursion in terms of the generation of its spring force. A spring excursion for the generation of the axial cup-spring force which produces the respective pressure forces is designated as the effective spring excursion. In this case, the cup spring 12 is overpressed somewhat beyond this effective spring excursion.

Before the commencement of the first part-stroke, the hydraulic piston 2 bears on the axially displaceable conical inner ring 8. An axial distance between the guide ring 10 and the hydraulic piston 2 has the effect that the components which are arranged on the left of the guide ring 10 remain uninfluenced during the first two part-strokes. When the hydraulic piston 2 is acted upon by pressure, a filling of the piston space K takes place via the duct A. Within the scope of the first part-stroke, the conical inner ring 8 is pushed axially towards the conical disc 9. When the conical surfaces of the two bodies 8 and 9 bear on one another, the second part-stroke makes it possible to bring the conical disc 9 up to the conical outer ring 11. In this phase, the conical disc 9 slides along with its tooth flanks of the internal toothing in the take-up toothing of the axially immovable transmission ring 24. At the same time, the conical disc 9 approaches the still virtually stationary conical disc 18. After the two lifting clearances between the conical inner ring 8, the conical outer ring 11 and the conical disc 9 are overcome, the hydraulic piston 2 comes to bear on the guide ring 10, since the distance is overcome. During the following two piston strokes, the conical outer ring 13 and the conical disc 18 are displaced in translational movement via the guide ring 10, the conical outer ring 11 and the cup spring 12. A transmission of moment of friction between the conical inner ring 19, the conical disc 18 and the conical outer ring 13 to two further friction pairings thus takes place. The normal force arising between the friction surfaces of the conical inner ring 19 and of the conical disc 18 leads, as a function of the cone angle, to an axial force. As a result of the force flux, this force is transmitted via the conical inner ring 19 to the guide 16 which is therefore exposed to additional load in the longitudinal direction. The guide 16 connected to the transmission case 1 can then support this axial force via the support ring 17 on the transmission case 1. The axial displacement of the components causes the two return springs 14 to be compressed.

After all the lifting clearances are overcome, the remaining stroke of the hydraulic piston 2 has the effect, via the guide ring 10 and the conical outer ring 11, of compressing the cup spring 12 which now presses against the fixed conical outer ring 13. The cup spring thereby generates a necessary axial force, that is to say a nominal spring force, which is required in order to generate the supporting moment. To assist the interlocking of the parking lock system, as already explained, the cup spring 12 is pressed somewhat beyond the spring excursion corresponding to the nominal spring force. A clearance can thereby be formed between the conical inner ring 8 and the locking bolts 27. This clearance is intended to ensure that said locking bolts slide out of the support ring 25 without difficulty. During the overpressure phase of the cup spring 12, action upon the locking bolts 27 by pressure takes place via the duct B and the annular groove incorporated into the support ring 25. During the disengagement of the bolts 27, tensioning of the helical tension springs 28 takes place. The locking bolts 27 have reached their end position when their end faces are in contact with the inside of the conical inner ring 8. Next, it is necessary to provide pressurelessness in the piston space K by means of the control components relevant for piston activation, in a shift plate S flanged to the transmission case 1 at the bottom. Since the cup spring 12 bears on the two conical outer rings 11, 13, the cup-spring force active on these components causes these to spread. The conical outer rings 11 and 13 are thereby pressed against the conical discs 9, 18 and the latter, in turn, against the conical inner rings 8, 19. During this spreading operation and the pressure reduction in the piston space K, the conical inner ring 8 is pressed, with the overpressure clearance being overcome, onto the locking bolts 27 which are then fixed in a self-locking manner in their extended state. At the same time, the hydraulic piston 2 moves somewhat in the direction of its initial position. The corresponding normal forces between the frictional surfaces can be generated. As a result of this yielding, above all of the components 8–11, the spring excursion arising from the overpressure stroke experiences a reduction by the amount of the overpressure clearance. The necessary effective spring excursion, which is to be assigned to the desired nominal spring force of the cup spring 12, is thus established. This nominal spring force acts, set up with the aid of the force equilibrium, on the two conical outer rings 11, 13 with the same amount. For the period of time of this operation, the locking bolts 27 remain acted upon by pressure, in order to avoid a return into the support ring 25.

Over the entire stroke, the piston return springs 6 are compressed as a result of the translational movement of the hydraulic piston. The operation of disengaging the parking lock mechanism is designed in such a way that, first, pressure is built up in the piston space K via the duct A and then acts on the piston 2 bearing on the guide ring 10 and the conical inner ring 8. The piston stroke thus initiated presses the conical inner ring 8 away from the locking bolts 27 which are then no longer acted upon by pressure. The tensioned helical tension springs 28 retract the locking bolts 27 in the support ring 25 again. At the same time, via the guide ring 10 and the conical outer ring 11, the cup spring 12 is overpressed beyond the effective spring excursion again according to the stroke. Support takes place once again on the conical outer ring 13. This operation, which is indispensable for release, is then followed by the actual disengagement.

In order to counteract the stress-relief bump originating from the drive-train distortion, pressure-controlled disengagement takes place. That is to say, by means of a throttled pressure reduction in the piston space K, a decelerating stress relief of the drive train is carried out. In this case, the friction brake is exposed to a phase of slipping release. If the distortion of the drive train has reformed, the introduction of a rapid pressure reduction in the oil space follows. Unnecessary slipping of the friction lining is thereby avoided. The pressureless piston space K then allows the return springs 14, the expanding cup spring 12 and the piston return springs 6 to displace the remaining hydraulic fluid out of the piston space and return the individual components to their initial position. This task of the springs 14, 6, 12 is made easier with the aid of a roller guide 31. The friction between the tooth flanks of the take-up toothings loaded via the corresponding external moments is thereby lowered. This results in an easier displacement of the respective components. If required, the further axially displaceable take-up toothings may be supplemented by a roller guide.

This return operation is assisted by the elasticity of the components. In this case, the hydraulic piston 2 is applied to a bearing surface incorporated in the case.

When wear occurs, a greater clearance is established between the conical inner ring 8 and the locking bolt 27 during overpressing, since, in comparison with unworn frictional linings, the components can be brought closer together from the point of view of an identical pressure build-up. In this case, the cup spring 12 compensates both this wear and manufacturing tolerances and thus at any time allows the reliable self-locking fixing of the locking bolt 27.

In a further embodiment, the parking lock mechanism is used in a continuously variable transmission, such as, for example, a wrap-around transmission, or a toroidal transmission.

The number of conically shaped components of the friction brake may vary from the embodiment illustrated. Moreover, in a further embodiment, a multiple-disc clutch may also be used.

The embodiments described are merely exemplary refinements. A combination of the features described for different embodiments is likewise possible. Further features, in particular features not described, of the device parts belonging to the invention may be gathered from those geometries of the device parts which are illustrated in the drawings.

We claim:

1. A motor vehicle transmission with a parking lock mechanism comprising a friction brake by which a frictional connection can be made between a transmission case and a transmission shaft, the friction brake being engageable and disengageable and including friction elements supported on the transmission case.

2. The motor vehicle transmission with a parking lock mechanism according to claim 1, wherein the friction brake comprises a plurality of conical friction elements.

3. The motor vehicle transmission with a parking lock mechanism according to claim 2, wherein the friction brake can be engaged hydraulically.

4. A motor vehicle transmission with a parking lock mechanism comprising a friction brake by which a frictional connection can be made between a transmission case and a transmission shaft, the friction brake being engageable and disengageable, wherein the friction brake comprises a plurality of conical friction elements, wherein the friction brake can be engaged hydraulically, and wherein the engaged friction brake is adapted to be held in an engaged position, free of hydraulic pressure, by an interlock.

5. The motor vehicle transmission with a parking lock mechanism according to claim 4, wherein, with the friction brake engaged, the interlock is fixed in a self-locking manner with respect to a displaceable component of the friction brake, and wherein a force accumulator applies a holding force necessary for self-locking.

6. The motor vehicle transmission with a parking lock mechanism according to claim 4, wherein a hydraulic supply for engaging the friction brake is separate from a hydraulic supply for releasing the interlock.

7. The motor vehicle transmission with a parking lock mechanism according to claim 5, wherein a hydraulic supply for engaging the friction brake is separate from a hydraulic supply for releasing the interlock.

8. The motor vehicle transmission with a parking lock mechanism according to claim 1, wherein said transmission shaft is a transmission output shaft.

9. A motor vehicle transmission with a parking lock mechanism comprising a friction brake by which a frictional connection can be made between a transmission case and a transmission shaft, the friction brake being engageable and disengageable, wherein the friction brake comprises a plurality of conical friction elements, and wherein said plurality of conical friction elements includes a guide ring, a first conical disc, a first conical outer ring, a second conical outer ring, a second conical disc, and a conical inner ring.

10. The motor vehicle transmission with a parking lock mechanism according to claim 4, wherein said interlock is provided by locking bolts.

11. The motor vehicle transmission with a parking lock mechanism according to claim 5, wherein said interlock is provided by locking bolts.

12. The motor vehicle transmission with a parking lock mechanism according to claim 11, wherein said displaceable component is a conical inner ring.

13. The motor vehicle transmission with a parking lock mechanism according to claim 12, wherein said force accumulator is a cup spring.

14. The motor vehicle transmission with a parking lock mechanism according to claim 5, wherein said displaceable component is a conical inner ring.

15. The motor vehicle transmission with a parking lock mechanism according to claim 5, wherein said force accumulator is a cup spring.

16. The motor vehicle transmission with a parking lock mechanism according to claim 6, wherein each hydraulic supply is defined by a duct.

17. The motor vehicle transmission with a parking lock mechanism according to claim 7, wherein each hydraulic supply is defined by a duct.

18. A process of operating a parking lock mechanism of a motor vehicle transmission which comprises a friction brake including friction elements supported on a transmission case comprising:

engaging the friction brake to make a frictional connection between the transmission case and a transmission shaft, and disengaging the friction brake to release said frictional connection.

19. The process according to claim 18, wherein engaging the friction brake is done hydraulically.

20. A process of operating a parking lock mechanism of a motor vehicle transmission which comprises a friction brake comprising:

engaging the friction brake hydraulically to make a frictional connection between a transmission case and a transmission shaft, disengaging the friction brake to release said frictional connection, and holding the friction brake in an engaged position, free of hydraulic pressure, by an interlock.

* * * * *